(12) United States Patent
Wilson et al.

(10) Patent No.: US 7,643,218 B2
(45) Date of Patent: Jan. 5, 2010

(54) LIGHT REDIRECTING FILM HAVING VARYING OPTICAL ELEMENTS

(75) Inventors: Randall H. Wilson, Albuquerque, NM (US); Paul J. Guiguizian, Pittsford, NY (US); Robert P. Bourdelais, Pittsford, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 504 days.

(21) Appl. No.: 11/514,015

(22) Filed: Aug. 31, 2006

(65) Prior Publication Data

US 2008/0055936 A1 Mar. 6, 2008

(51) Int. Cl.
*G02B 13/10* (2006.01)
(52) U.S. Cl. ............... 359/669; 359/668; 362/31
(58) Field of Classification Search ........ 359/669, 359/668; 362/31, 330, 627
See application file for complete search history.

(56) References Cited

U.S. PATENT DOCUMENTS

| 5,771,328 | A | 6/1998 | Wortman et al. |
| 5,919,551 | A | 7/1999 | Cobb, Jr. et al. |
| 6,354,709 | B1 | 3/2002 | Campbell et al. |
| 6,752,505 | B2 * | 6/2004 | Parker et al. ........... 362/627 |
| 6,862,141 | B2 | 3/2005 | Olczak |
| 2005/0122591 | A1 | 6/2005 | Parker et al. |
| 2005/0147374 | A1 | 7/2005 | Gardiner |
| 2005/0280752 | A1 | 12/2005 | Kim et al. |
| 2006/0055627 | A1 | 3/2006 | Wilson |
| 2007/0010594 | A1 * | 1/2007 | Wang et al. ........... 522/182 |

\* cited by examiner

*Primary Examiner*—Timothy J Thompson
(74) *Attorney, Agent, or Firm*—Edwin Oh

(57) ABSTRACT

The invention relates to a light redirecting film comprising a thin optically transparent substrate having opposite sides, one side of the substrate substantially covered by elongated individual optical elements whose longest dimensions are substantially aligned in a lengthwise direction, wherein the shape of at least some of the optical elements have a visually significant difference, and wherein the layout of optical element shapes and locations is such that objectionable patterns are not visible in the film under standard LCD backlight viewing conditions.

7 Claims, 18 Drawing Sheets

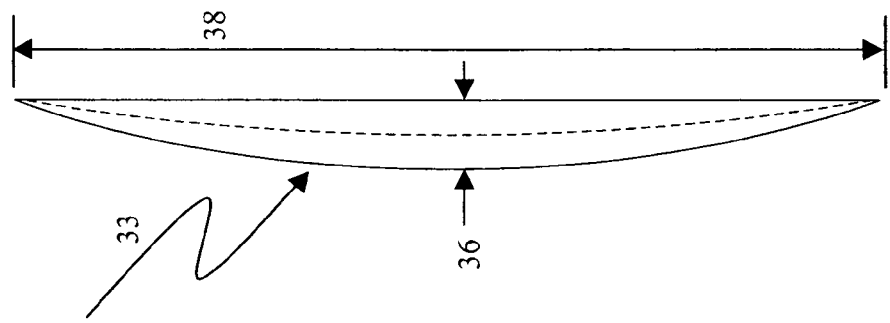
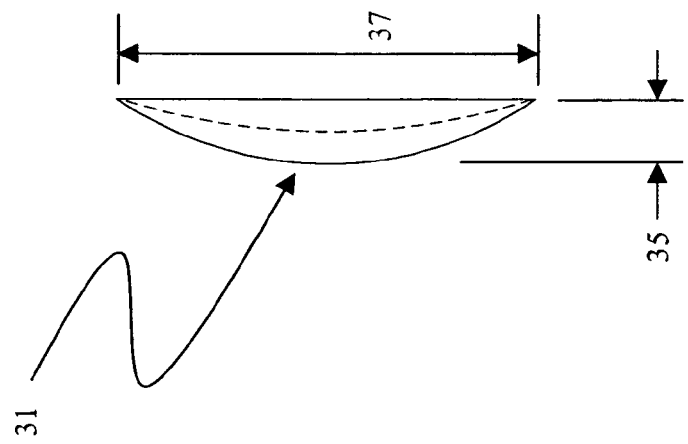
Figure 6

LIGHT REDIRECTING FILM HAVING VARYING OPTICAL ELEMENTS

FIELD OF THE INVENTION

The present invention relates generally to a light redirecting film for inclusion in an optical display assembly. More particularly the invention relates to light redirecting films having individual optical elements wherein the layout of optical element shapes and locations is such that objectionable patterns are not visible.

BACKGROUND OF THE INVENTION

The use of a variety of light redirecting films in backlit displays is well known. Light redirecting films are typically thin transparent optical films or substrates that redirect the light passing through the films such that the distribution of the light exiting the films is directed more normal to the surface of the films. The output light intensity normal to the film divided by input light intensity normal to the film is called the "on-axis gain" of the film. Typically, light redirecting films are provided with ordered prismatic grooves, lenticular grooves, or pyramids on the light exit surface of the films which change the angle of the film/air interface for light rays exiting the films and cause the components of the incident light distribution traveling in a plane perpendicular to the refracting surfaces of the grooves to be redistributed in a direction more normal to the surface of the films. Such light redirecting films are used, for example, to increase brightness in liquid crystal displays (LCDs) in laptop computers, televisions, desktop monitors, cell phones and the like.

Previous light redirecting films suffer from visible Moiré patterns when the light redirecting film is used with a liquid crystal or other display. The surface elements of the light redirecting film interact with other optical films, the pattern of printed dots or three-dimensional elements on the back of the light guide plate, or the pixel pattern inside the liquid crystal modulator to create Moiré, an undesirable effect. Methods known in the art for reducing Moiré include die cutting the light redirecting films at an angle to change the average pitch of the linear array, randomizing the linear array by widths of the linear array elements, varying the height along the linear array, or adding diffusing films to the display assembly. The above techniques to reduce Moiré also cause a decrease in on-axis brightness or do not work to adequately solve the Moiré problem. Moiré and on-axis brightness tend to be related, meaning that a film with high on-axis gain would have high Moiré in a system. It would be beneficial to be able to reduce the Moiré while maintaining sufficient on-axis gain.

Previous light redirecting films also suffer from high quality requirements and production costs. Very small defects in linear arrays of prisms, stray contamination particles, and small scratches can be visible in the film and assembled display. In addition, defects on lower layers of the display assembly are often visible through the light redirecting film. As a result the films suffer from high reject rates and low yield, or they must be manufactured to exacting standards, in clean rooms, and with great care in handling during fabrication and assembly into displays. Methods known in the art for making the films more resistant to defect visibility include varying the height of the prisms along the linear array, as disclosed in U.S. Pat. No. 6,354,709 (Campbell et al.), or adding diffusing films to the display assembly. The above techniques increase cost, cause a decrease in on-axis brightness, or do not adequately hide defects. It would be beneficial to be able to hide defects in and under the light redirecting film while maintaining high on-axis gain.

U.S. Pat. No. 5,919,551 (Cobb, et al) claims a linear array film with variable pitch peaks and/or grooves to reduce the visibility of Moiré interference patterns. The pitch variations can be over groups of adjacent peaks and/or valleys or between adjacent pairs of peaks and/or valleys. While this varying of the pitch of the linear array elements does reduce Moiré, the linear elements of the film still interact with the dot pattern on the backlight light guide and the electronics inside the liquid crystal section of the display. It would be desirable to break up the linear array of elements to reduce or eliminate this interaction.

U.S. Pat. No. 6,752,505 (Parker et al.), incorporated herein by reference, discloses the use of individual optical elements for redirecting light, including individual optical elements of varying size and shape. However, light redirecting films with varying individual optical elements can have unexpected problems that can be difficult to solve, including loss of gain, varying gain, cosmetic defects, and visually objectionable patterns. It would be desirable to have a film that achieves the advantages of varying individual optical elements yet avoids these problems.

PROBLEM TO BE SOLVED BY THE INVENTION

There is a need for a light redirecting film that has multiple sizes or shapes of individual optical elements to reduce Moiré, mask cosmetic defects, and avoid visually objectionable patterns in the film.

SUMMARY OF THE INVENTION

It is an object of the invention to provide a light redirecting film that reduces the occurrence of Moiré in a liquid crystal display system while maintaining high gain.

It is a further object to provide a light redirecting film that masks cosmetic defects in or under the film.

It is a further object to provide a light redirecting film without visually objectionable patterns.

It is a further object to provide a light redirecting film that has raised elements to provide space between the rest of the elements and the contacting layer of the display assembly.

These and other objects of the invention are accomplished by a light redirecting film comprising a thin optically transparent substrate having opposite sides, one side of the substrate substantially covered by elongated individual optical elements whose longest dimensions are substantially aligned in a lengthwise direction, wherein the shape of at least some of the optical elements have a visually significant difference, and wherein the layout of optical element shapes and locations is such that objectionable patterns are not visible in the film under standard LCD backlight viewing conditions.

ADVANTAGEOUS EFFECT OF THE INVENTION

Embodiments of the invention provide light redirecting films that reduce Moiré, mask cosmetic defects, provide high on-axis gain, and avoid objectionable visual artifacts when used in a liquid crystal display.

BRIEF DESCRIPTION OF THE DRAWINGS

FIG. 6 shows a schematic drawing of two individual optical elements that have the same width, but different radii of curvature and length.

DETAILED DESCRIPTION OF THE INVENTION

Embodiments of the invention have numerous advantages compared to current light redirecting films. Two or more size and shape distributions of optical elements and their placement on the film produce high on-axis gain while significantly reducing Moiré. The light redirecting film of the invention has a diffuse or textured look and avoids objectionable patterns. The multiple shapes of optical elements mask cosmetic defects in and under the light redirecting film. A minor portion of optical elements extending above the rest of the elements provide space between the film and contacting surfaces, to avoid optical coupling at the ridges of most elements, avoid Newton rings, and protect the ridges of most elements from damage. The film of the invention provides a higher on-axis gain with multiple sized elements than a light redirecting film with only one sized element. These and other advantages will be apparent from the detailed description below.

Individual optical elements, in the context of an optical film, mean elements of a well-defined shape that can be projections or depressions in the optical film. Individual optical elements are small relative to the length and width of the optical film.

Figure 1:
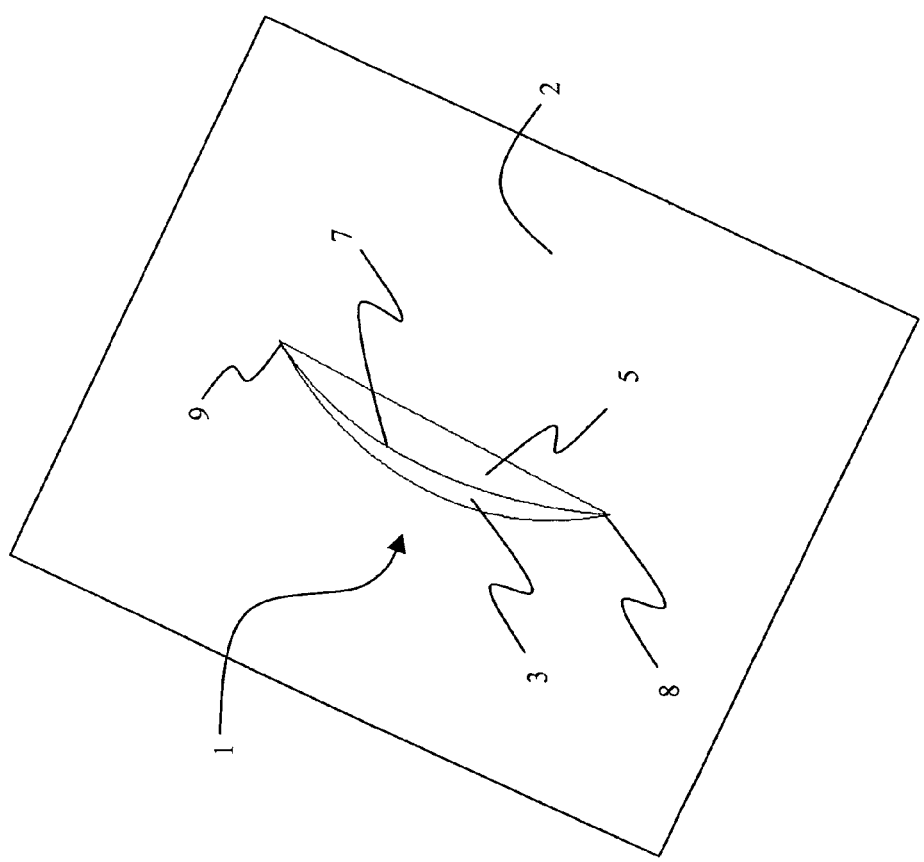
FIG. 1 shows a schematic drawing of a prior art single individual optical element, with one curved surface, one planar surface, and a ridge.

FIGS. 1 through 3B represent the prior art as more fully described in U.S. Patent Publication No. 2006/0055627. FIG. 1 shows a schematic drawing of an individual optical element 1 on a substrate 2. The optical element has one curved surface 3 intersecting a planar surface 5 at a ridge 7. Both curved surface 3 and planar surface 5 are sloped relative to the plane of the substrate 2. The ridge 7 has two ends 8 and 9 where the ridge intersects the substrate 2. In other cases the ridge may end where it intersects other optical elements. Curved surface 3 is cylindrical and its radius of curvature is the radius of the cylinder.

Figure 2:
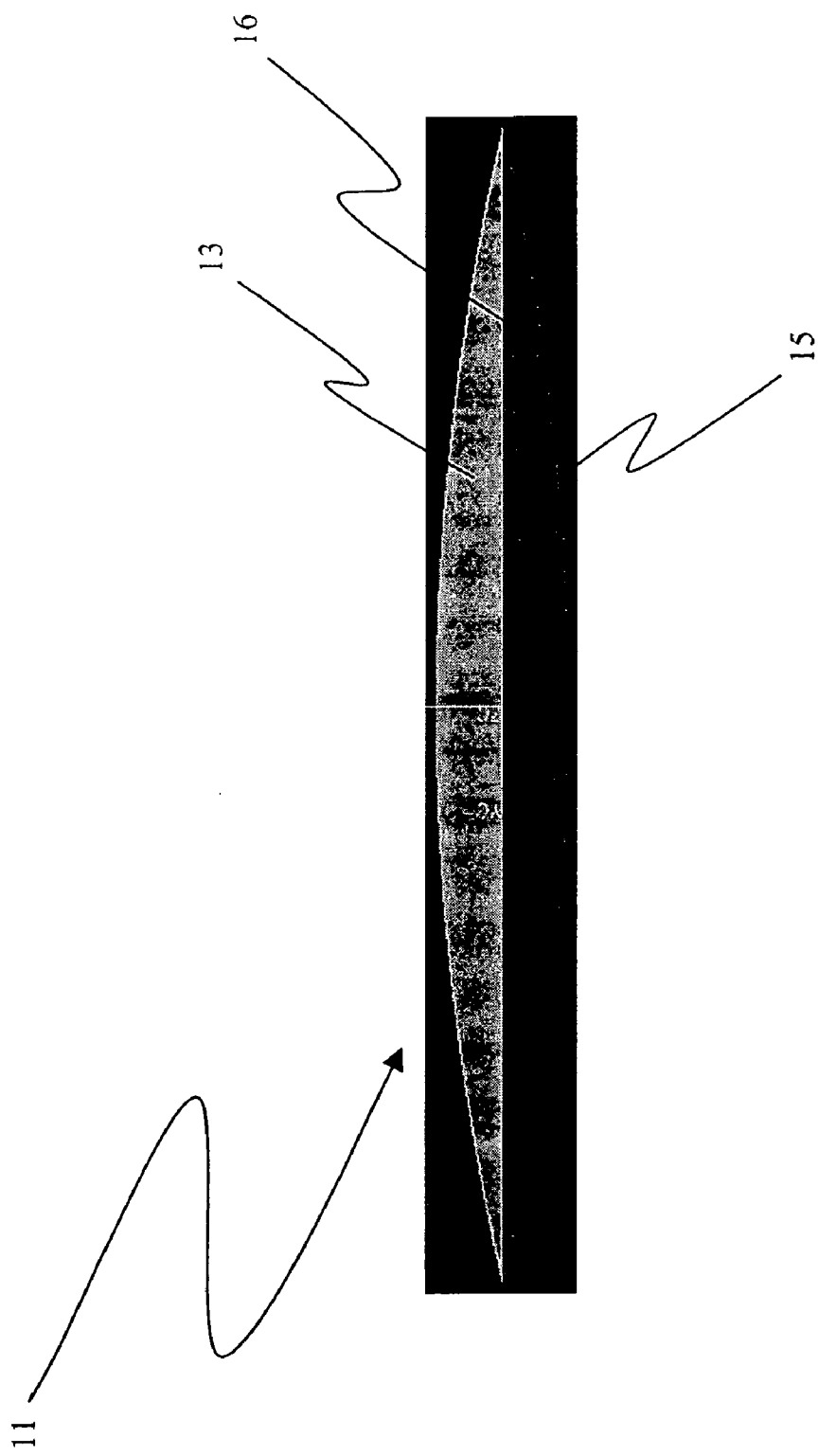
FIG. 2 shows a schematic drawing of a prior art single individual optical element, with two curved surfaces and a ridge.

FIG. 2 shows a top view of another individual optical element 11 with two curved surfaces 13 and 15 intersecting at a ridge 16. In this case, curved surfaces 13 and 15 are not cylindrical, but they may be associated with an approximate radius of curvature by fitting a cylindrical or spherical surface to them and then using the radius of the fitted cylinder or sphere.

The elements have a cross section indicating an included angle at the highest point of the element in the range of 70 to 110 degrees. Preferably, the elements have a cross section indicating a 90 degree included angle at the highest point of the element. It has been shown that a 90 degree ridge angle produces the highest on-axis brightness for the light redirecting film. The 90 degree angle has some latitude to it; it has been found that an angle of 88 to 92 degrees produces similar results and can be used with little to no loss in on-axis brightness.

Figure 3B:
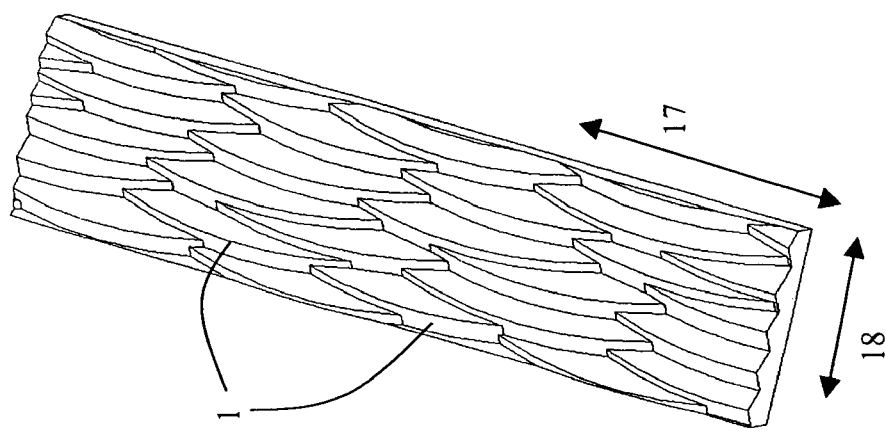
FIG. 3B shows a schematic drawing of a prior art light redirecting film with an engineered random layout of elements.
Figure 3A:
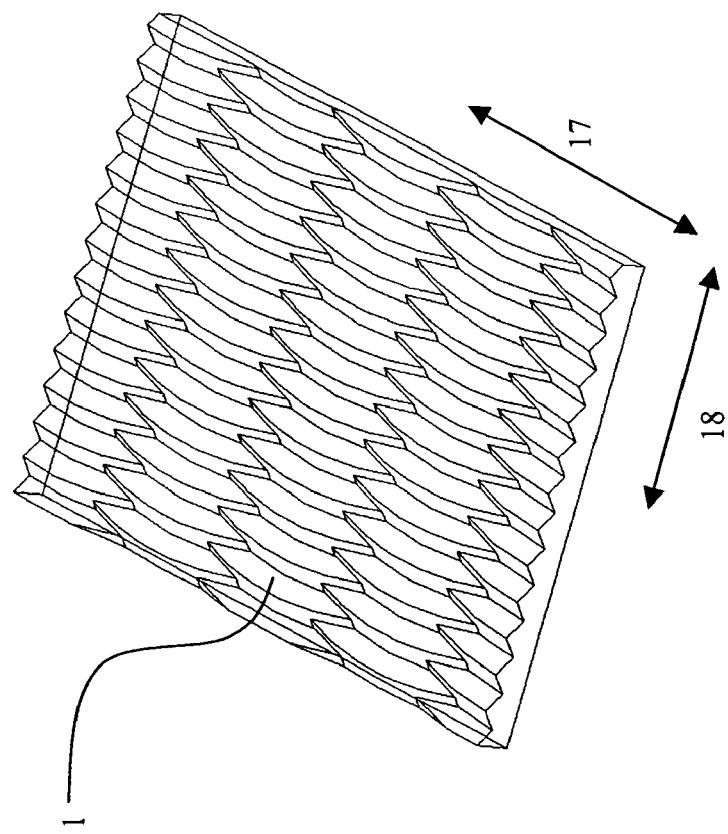
FIG. 3A shows a schematic drawing of a prior art light redirecting film with an ordered layout of elements.

FIG. 3A shows a perspective view of a portion of a prior art light redirecting film whose surface is covered by individual optical elements 1 that all have the same shape. The positions of the elements 1 follow an ordered layout in a two-dimensional grid. FIG. 3B shows a perspective view of a portion of another prior art light redirecting film whose surface is covered by individual optical elements 1 that all have the same shape. In FIG. 3B, the positions of the elements 1 are randomized, so that the elements overlap and intersect in varying ways. The light redirecting film could be an integral structure made of a single material and having no well-defined transition point between the elements and the substrate. Alternatively, the light redirecting film could be composed of elements formed on the surface of a substrate, possibly of different materials.

Preferably, the individual optical elements of the invention are substantially parallel to each other, with their longest direction generally aligned in the same direction 17, which is called the lengthwise direction. It is preferred to have generally aligned elements so that the film redirects more in one direction than the other, because in many applications this is desired as a viewing characteristic of the liquid crystal display. In addition, patterns of generally aligned optical elements can typically cover the surface of the film with fewer elements while avoiding uncovered area. The perpendicular direction to the lengthwise direction 17 is the widthwise direction 18.

Figure 4:
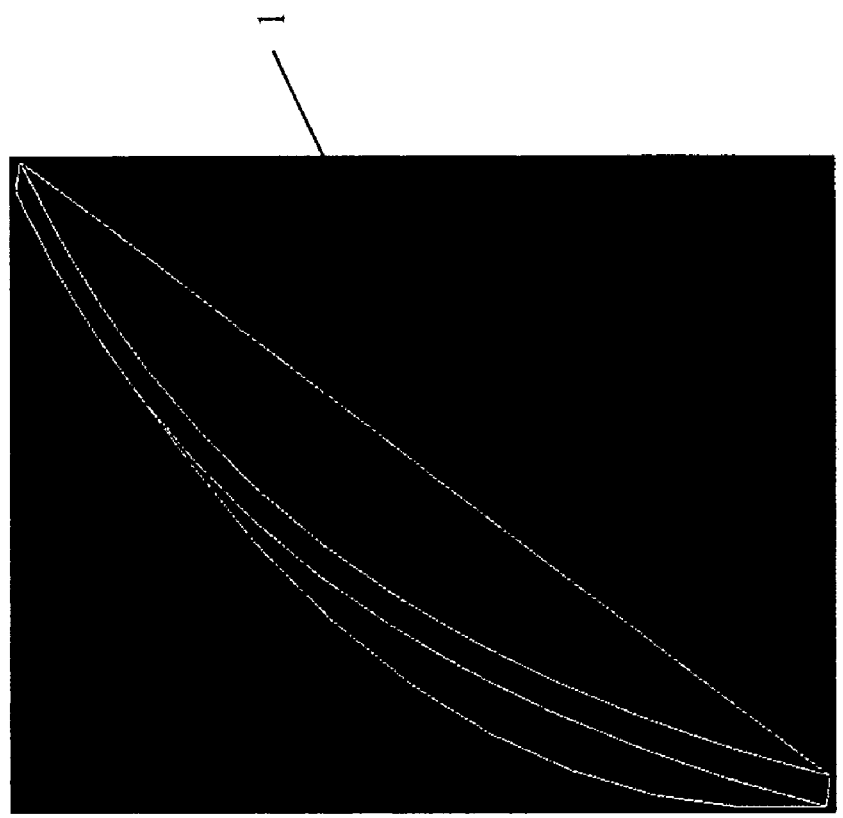
FIG. 4 is a schematic that shows an example of a land.

In practice the ridges of individual optical elements cannot be perfectly sharp due to manufacturing imperfections. FIG. 4 is a schematic view of an individual optical element 1 with a flat land area 21 at its ridge, drawn with exaggerated size to make it visible. In other cases the land may be rounded or have other shapes. The smaller the land 21 of the elements on the light redirecting film, the more the film will redirect light.

Figure 5:
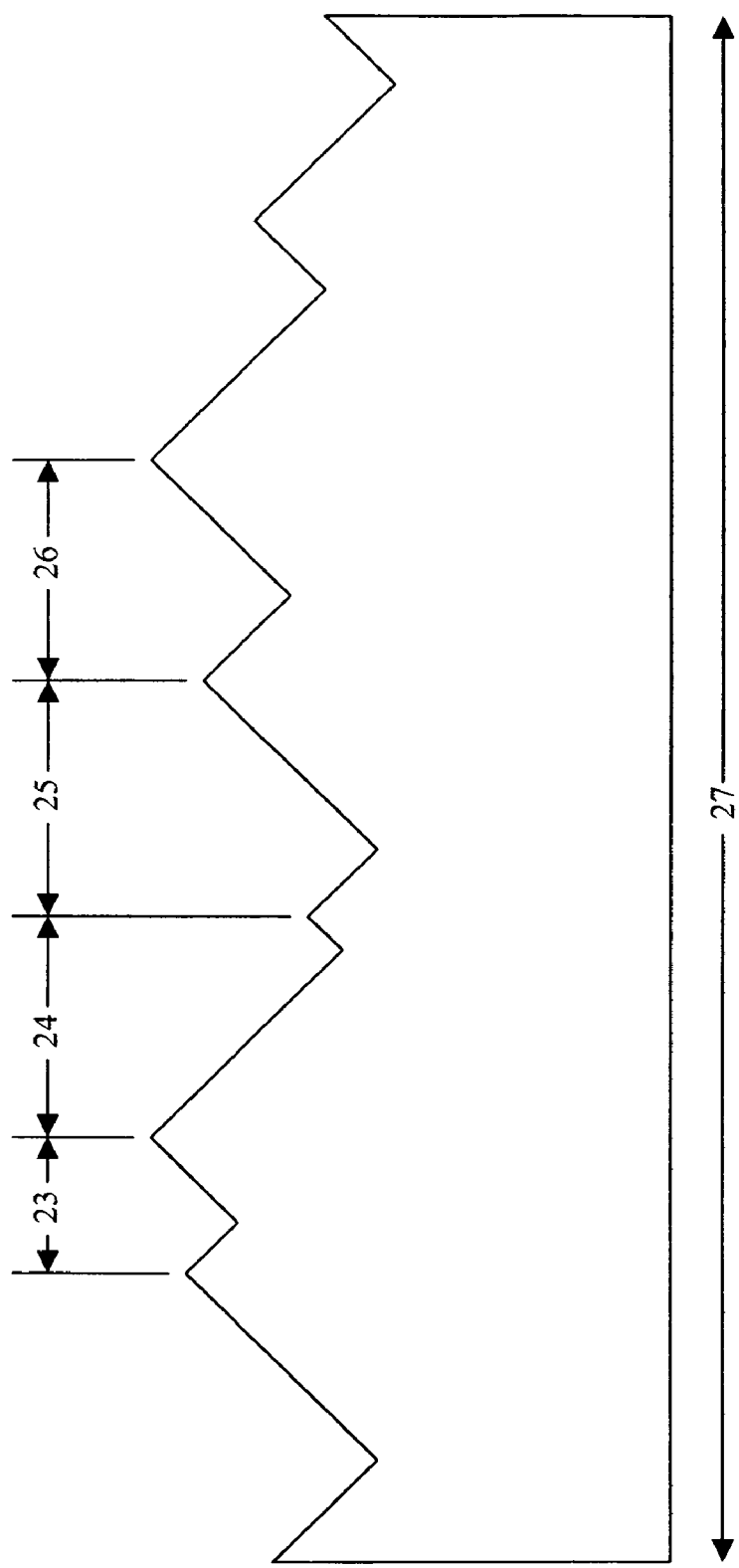
FIG. 5 shows a schematic of a cross-section of the light redirecting film of the invention.

It is preferable to cover the film surface with fewer optical elements to minimize the portion of the film surface covered by lands, so as to achieve high on-axis gain. The average pitch of a light redirecting film is the average horizontal distance from a point on one element ridge to a point on the horizontal neighboring element ridge. The average pitch is different than the width of the elements because the elements vary in dimension and they are overlapping, intersecting, and randomly placed on the surface of the film to reduce Moiré. Taking a widthwise cross-section of the film and dividing its width by the number of peaks of elements in the cross-section determines the average pitch. For example, FIG. 5 shows a schematic of a widthwise cross-section of the light redirecting film of the invention according to one embodiment. The pitch of each of the elements with its neighboring element varies across the film. For example, pitches 23, 24, 25, 26 all differ. The average pitch of the elements is calculated by taking the width 27 of the cross-section of the film and dividing it by the number of ridges in that section.

Preferably, the light redirecting film has an average pitch of between 20 and 55 micrometers. When the average pitch is lower than 20 micrometers, the on-axis gain is significantly lower, and when the average pitch is higher than 55 micrometers the optical elements become large enough to be visible to a human observer.

Preferably, a light redirecting film with high on-axis brightness has less than 1% uncovered area. Uncovered area is any area of the film substrate that is not covered by optical elements. Uncovered area reduces the on-axis brightness of the light redirecting film by allowing transmission of light at any angle to pass. Furthermore, in some cases uncovered area on the light redirecting film can be visible to an observer. As a result, the light redirecting film preferably does not have any uncovered area.

Moiré results when two or more regular sets of lines or points overlap. It results in a pattern of repeating lines or shapes, the line size and frequency depending on the two patterns interacting. A light redirecting film may contribute to Moiré due to the light scattering off the ridges of the optical elements, which form a repeating pattern that interacts with other structures in the display. Moiré patterns that can be observed by the viewer of the display interfere with the quality of the displayed information or image. Light redirecting films comprising individual optical elements have reduced Moiré compared to light redirecting films comprising arrays of prisms. By utilizing multiple element shapes, the light redirecting film of the invention further reduces Moiré compared to prior art light redirecting films while maintaining a high level of on-axis gain.

FIG. 6 shows a schematic drawing of two individual optical elements. The two elements 31 and 33 have equal widths 35 and 36 but their curved sides have different radii of curvature, element 33 having a larger radius of curvature than element 31. The length 37 of element 31 is smaller than the length 38 of element 33. When an individual optical element overlaps or intersects other elements on a substrate, then the length of the element is the longest dimension of the element measured in the lengthwise direction, and the width is the longest dimension measured in the widthwise direction. The ratio of an element's length to its width is called its aspect ratio. An elongated optical element has an aspect ratio of 2 or greater.

As will be appreciated by those skilled in the art, different shaped individual optical elements will redirect the same distribution of input light into different output luminance distributions. For example, a shorter element with higher surface curvature redirects more light traveling along multiple axes of the optical film, while a longer element redirects more light traveling in the widthwise direction. For another example, an element with a cylindrical curved surface will redirect light differently than an element with an elliptical curved surface. Other shape variations will cause changes in output light variation as well.

Figure 7:
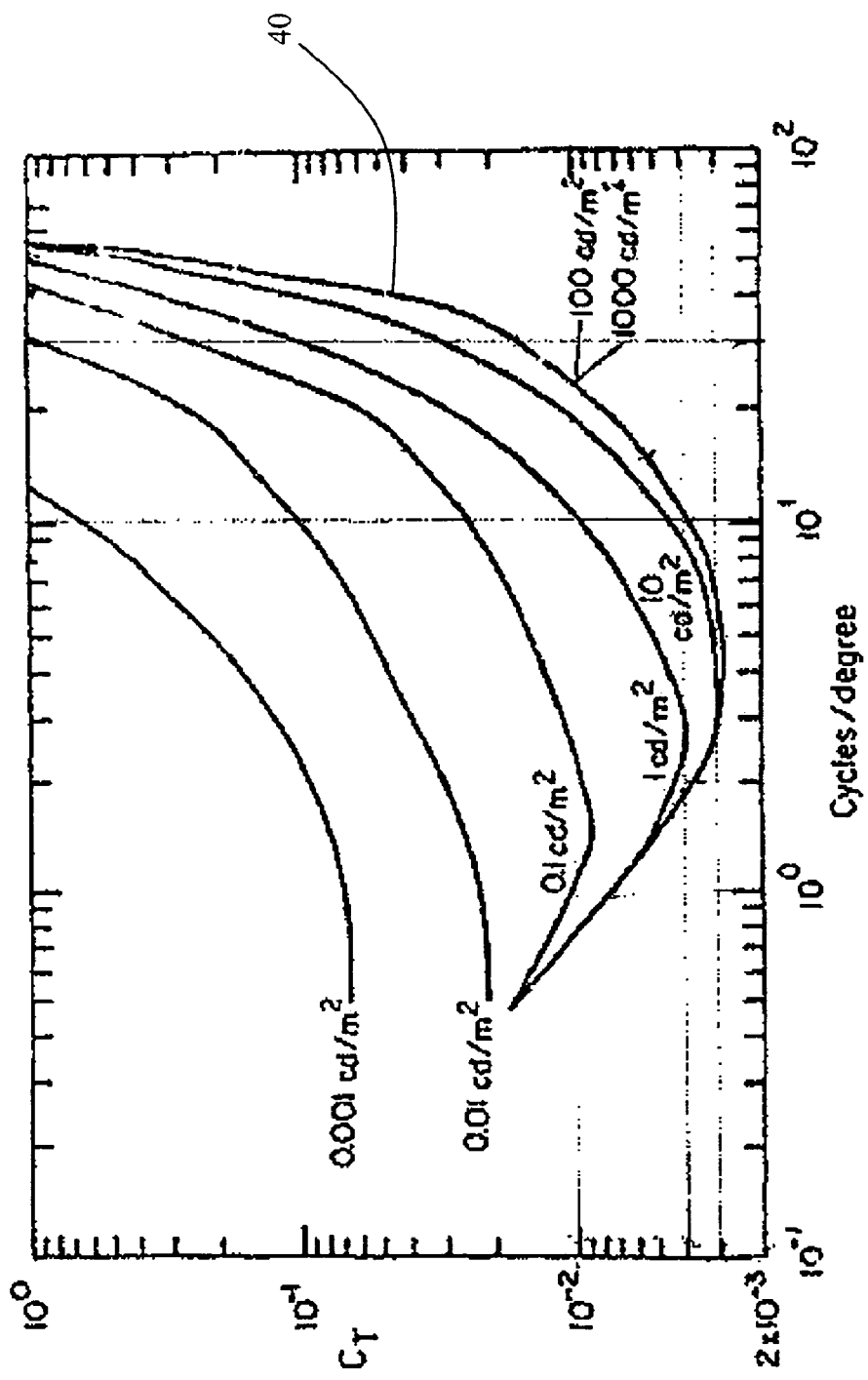
FIG. 7 is a graphical representation of the visual response of the human eye.

FIG. 7 is a graphical representation of the Van Ness-Bouman curves relating sensitivity of the human eye to variations in brightness. The term "normal visual acuity" as used herein means an acuity as shown in FIG. 7. Each curve represents the minimum contrast the eye can detect for various levels of brightness, as a function of cycles per degree. Contrast $C_T$ between regions with luminous intensities $I_1$ and $I_2$ is defined as $$C_T = \frac{|I_1 - I_2|}{I_1 + I_2}.$$

A typical desktop computer monitor has a brightness above 100 cd/m2, so the human eye response is governed by the lowest curve 40. At this brightness, the eye is most sensitive to frequencies between 2 and 10 cycles/degree, peaking at 5 cycles/degree. In this range the visual threshold is approximately 0.3% modulation. At a standard desktop monitor viewing distance of 450 mm, one degree subtends approximately 8 mm, meaning the human eye is most sensitive to alternating lines or regions ranging in size from 0.4 to 2 mm in width, peaking at about 1 mm.

Two individual optical elements are visually different if the luminance distributions created by neighboring regions composed of the two shapes on the same film are distinguishable by a human observer from at least one viewing angle. However, some visually different element shapes are barely distinguishable. For the purpose of objectionable patterns and masking cosmetic defects, element luminance must have a contrast of about 1% or more to be significant, and contrast higher than 1% makes the elements even more distinguishable. For these reasons, two individual optical elements are visually significantly different if the luminance distributions created by neighboring regions composed of the two shapes have a contrast $C_T$ of at least 1% when viewed from at least one viewing angle. Preferably, light redirecting films are composed of elements whose shapes have a contrast of approximately 5% or greater at some viewing angles, for a greater ability to mask cosmetic defects.

Figure 8:
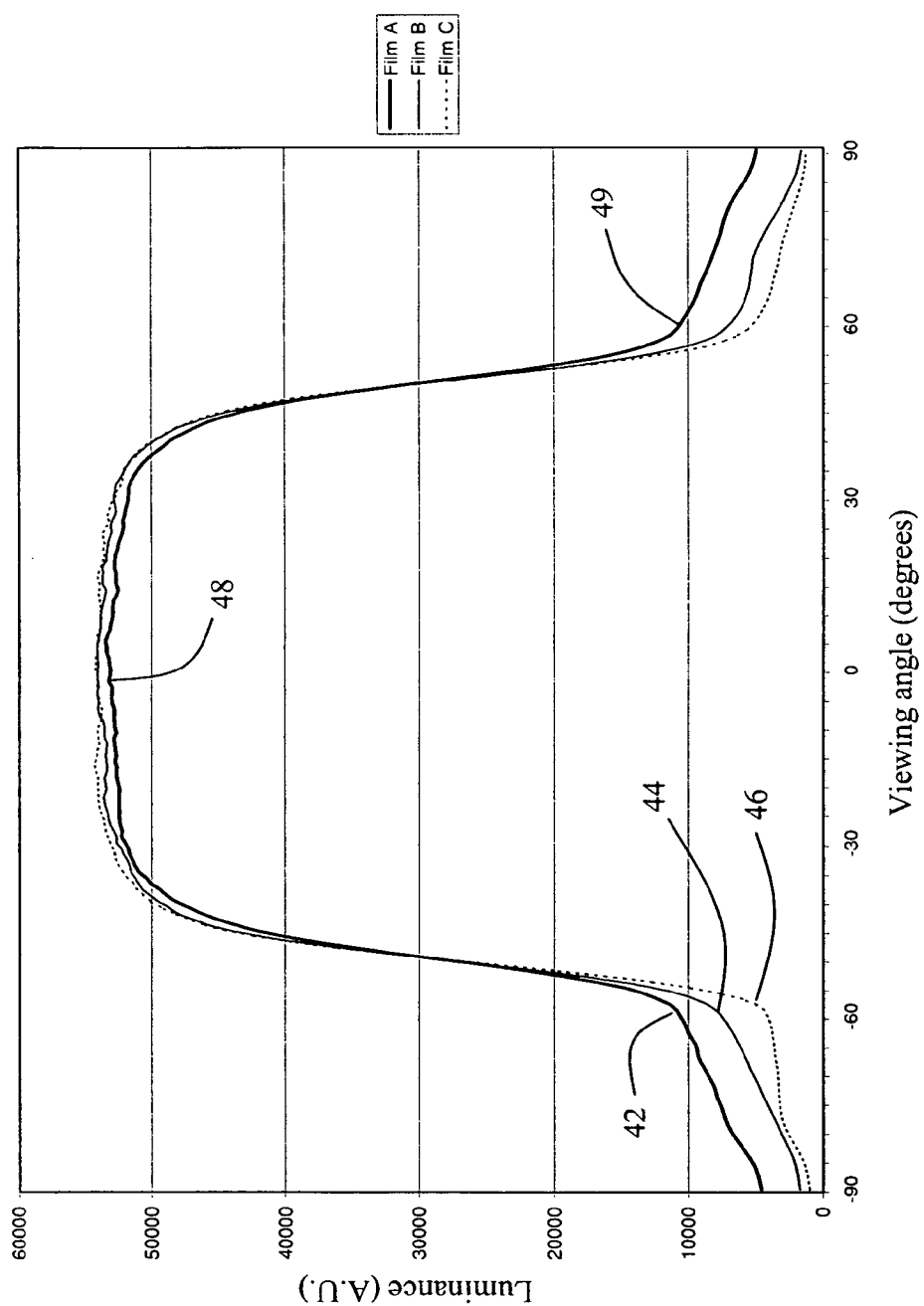
FIG. 8 is a graphical representation of the luminance of example light redirecting films.

FIG. 8 is a graphical representation of the simulated luminance distributions of three example light redirecting films. Each film is covered with optical elements of a single shape. All of the optical elements have one planar and one cylindrical surface, and they are arranged in alternating orientations. The light input distribution is lambertian. Each curve represents the luminance at viewing angles measured from on-axis in the plane perpendicular to the widthwise direction; the viewing angle measured from on-axis in the plane perpendicular to the lengthwise direction is 0. In film A, all elements have an aspect ratio of 7, resulting in curve 42. In film B all elements have an aspect ratio of 17, resulting in curve 44. In film C all elements have an aspect ratio of 27, resulting in curve 46. At point 48 on film A is slightly less bright on-axis than films B or C, making the elements of films B or C preferred for composition in a light redirecting film. The contrast $C_T$ between film A and either film B or film C is approximately 1.1%, but the contrast between films B and C is 0.2%, which is not visually distinguishable. Viewed from an angle 60 degrees off-axis, film A (at point 49) is brighter than film B, which is brighter than film C. The contrast $C_T$ between films B and C at angle 49 is approximately 14%, making the two shapes easily distinguished visually at that angle.

Figure 9:
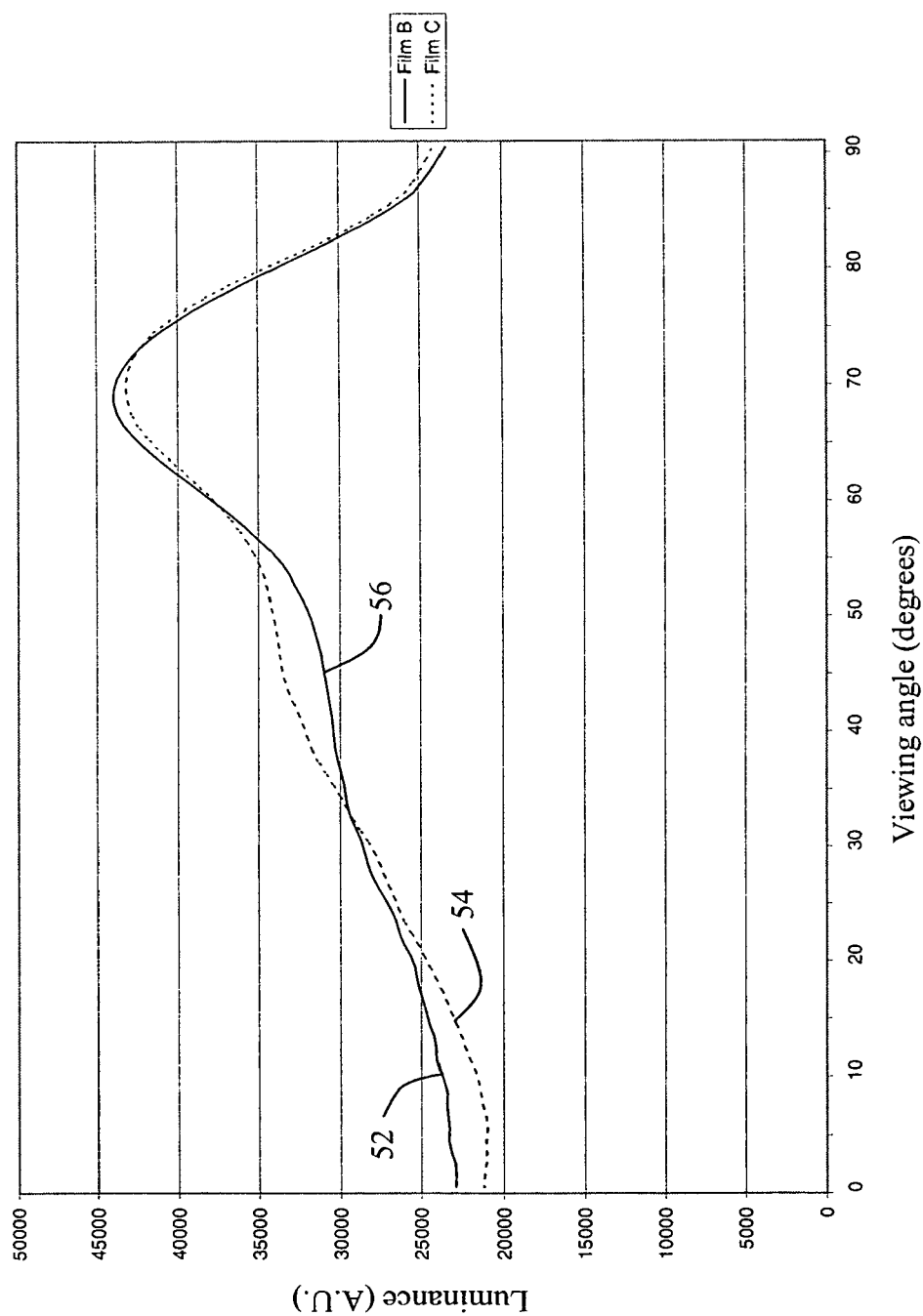
FIG. 9 is a graphical representation of the luminance of example light redirecting films.

FIG. 9 is a graphical representation of another portion of the simulated luminance distributions of films B and C. Each curve represents the luminance at viewing angles measured in the plane perpendicular to the widthwise direction; the viewing angle measured in the plane perpendicular to the lengthwise direction is 64 degrees. Curve 52 is the luminance for film B and curve 54 is the luminance for film C. The maximum contrast is achieved at 45 degrees off-axis at point 56, where the contrast is approximately 4%.

Individual optical elements that cover light redirecting films with high on-axis gain are typically elongated, preferably with aspect ratios above 5, and more preferably with aspect ratios above 15. Generally for such elements, changes in aspect ratio of approximately 5% or greater are visually significant. In experiments with light redirecting films, changes in aspect ratio of less than 5% have generally not exhibited advantages over films covered by a single shape of element. Generally changes in curvature of the surfaces of elements of approximately 10% or greater are visually significant. Larger changes of approximately 15% or greater in aspect ratio or 30% or greater in curvature are preferable to maximize the advantages of visually different element shapes. It is preferable for the longer elements to have an aspect ratio that is less than 100% longer than the shorter elements, because otherwise the shorter elements tend to reduce on-axis gain of the resulting film.

Optical elements with varying shapes on a single film help to mask cosmetic defects by introducing spatial variation in the luminance. A light redirecting film made with visually significantly different shapes has a diffuse, speckled, or textured appearance. The contrast of the texture is more pronounced at viewing angles at which the luminance distributions of the elements vary more. This appearance acts as visual noise to help mask the change in luminance introduced by the presence of a particle, defect, or brightness variation in the input luminance from layers below the light redirecting film. Preferably, the element shapes vary sufficiently to substantially mask cosmetic point or spot defects having maximum dimensions equal to or less than 4 times or more preferably equal to or less than 8 times the average pitch of the film. Preferably, the element shapes vary sufficiently to substantially mask cosmetic line defects and scratches having maximum length equal to or less than 3 times or more preferably equal to or less than 6 times the length of the longest elements. The varying element shapes also distribute varying light from under the film in different directions, helping to diffuse the light, make the output more uniform, and hide small defects under the film. The overall luminance distribution from the film is generally a combination of the luminance distributions that result from each element shape individually.

Unexpected side effects can result from use of individual optical elements, including multiple element shapes on a single film. Several objectionable patterns, of types enumerated below, may be visible on light redirecting films when sufficient care is not taken to choose and place the optical element shapes on the film. In some cases the objectionable patterns are visible through a liquid-crystal modulator in a display assembly, and in other cases the objectionable patterns are visible when the film is viewed alone on a backlight. The visibility of objectionable patterns will vary with many factors, including the optical elements composing them, viewing conditions, light levels, and other films and parts in an assembled display. However, in general objectionable patterns are to be avoided in light redirecting films because of the exacting viewing requirements of displays.

One objectionable pattern that occurs, especially in ordered layouts such as that shown in FIG. 3A, is a pattern of lines parallel to the widthwise direction 18. These widthwise lines are the images of the ends of optical elements 1. Widthwise lines can also be visible in layouts using varying element shapes where the elements of each shape are laid out in an ordered way, for example if alternating rows of elements 1 in FIG. 3A were replaced by longer elements. For another example, layouts of varying individual optical element shapes such as those shown in FIGS. 45 and 46 of U.S. Pat. No. 6,752,505 will also exhibit widthwise lines in a high gain light redirecting film.

Figure 10B:
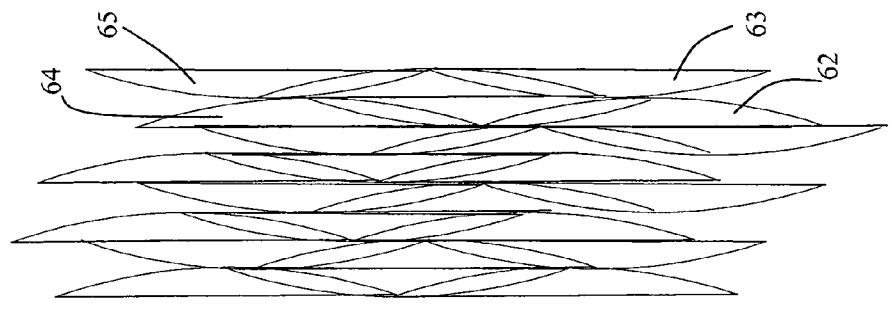
FIG. 10B is a schematic drawing of a light redirecting film layout with a random column offset.
Figure 10A:
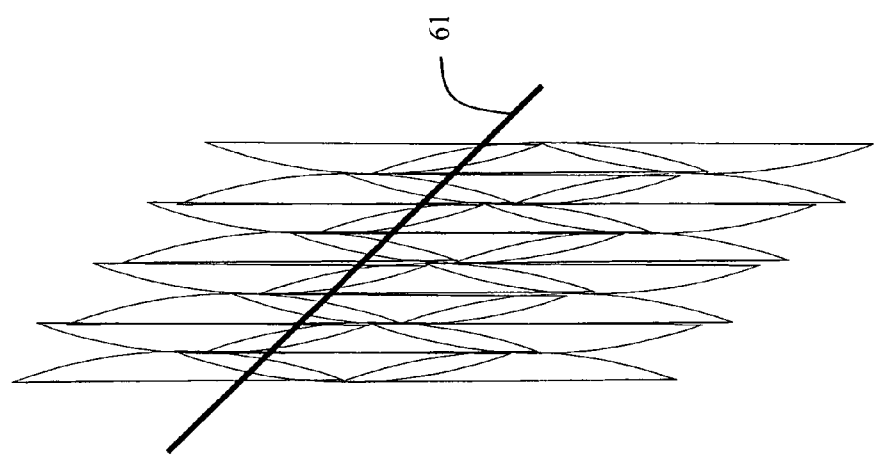
FIG. 10A is a schematic drawing of a light redirecting film layout with a constant column offset.

Another objectionable pattern consists of diagonal lines not aligned with either the lengthwise or widthwise direction of the film. Diagonal lines may be caused by ordered layouts using a constant offset from one column of elements to another. An example is shown in FIG. 10A, with one possible line location 61 indicated. Diagonal lines can also cause off-angle Moiré problems when the film is assembled in a display.

To avoid linear and diagonal lines, a light redirecting film can be created with a random column offset. FIG. 10B shows a schematic diagram of an example film with a random column offset. However, a random column offset can cause another objectionable pattern called lengthwise lines to appear. Lengthwise lines result from the slight variation in luminance induced by the relative position of neighboring elements, when light refracts or reflects off of the two neighboring elements, causing a change in the luminance pattern. Lengthwise lines also result from the constant lengthwise spacing of elements with a single length. For example, in the two neighboring columns of elements that include elements 62 and 63, there will be pairs of elements, such as elements 64 and 65, that have the same relative positioning as do elements 62 and 63. Even if each element is displaced randomly from its nominal position, the average relative position of pairs of elements will be approximately maintained across the entire row. The random offsets induce a random-looking linear pattern of darker and lighter lengthwise lines in the light redirecting film. These lengthwise lines are most visible at viewing angles of approximately 60 to 70 degrees from on-axis in the widthwise direction, in the approximate viewing angles shown in FIG. 9.

Randomized layouts of varying element shapes and spacings are preferred to reduce Moiré, cause a more diffuse film appearance, and avoid the objectionable patterns above. As used herein, the terms random and randomized will be understood to include pseudo random. The preferred layouts of the present invention are engineered random, meaning that they result from a combination of aspects of carefully designed and ordered layouts combined with aspects of random layouts. For example, placing elements in an ordered layout and then applying random displacements to the element locations and/or shapes is an example of an engineered random layout. A completely random layout, such as choosing each random element location independently, requires a very large number of elements to substantially cover the surface of the film, resulting in low on-axis gain.

Random and engineered random layouts can themselves introduce problems, including objectionable patterns. The random offset that produces lengthwise lines is one example. Another objectionable pattern that can result from random or engineered random layouts with visually significantly different element shapes is a blotchy pattern. A blotchy pattern is visible when large enough clumps of a single element shape are present in the layout. Because the elements are visually significantly different, viewing angles exist at which the clumps can be distinguished from the surrounding elements, and they appear to a viewer to be blotchy, grainy, or variegated.

Figure 11:
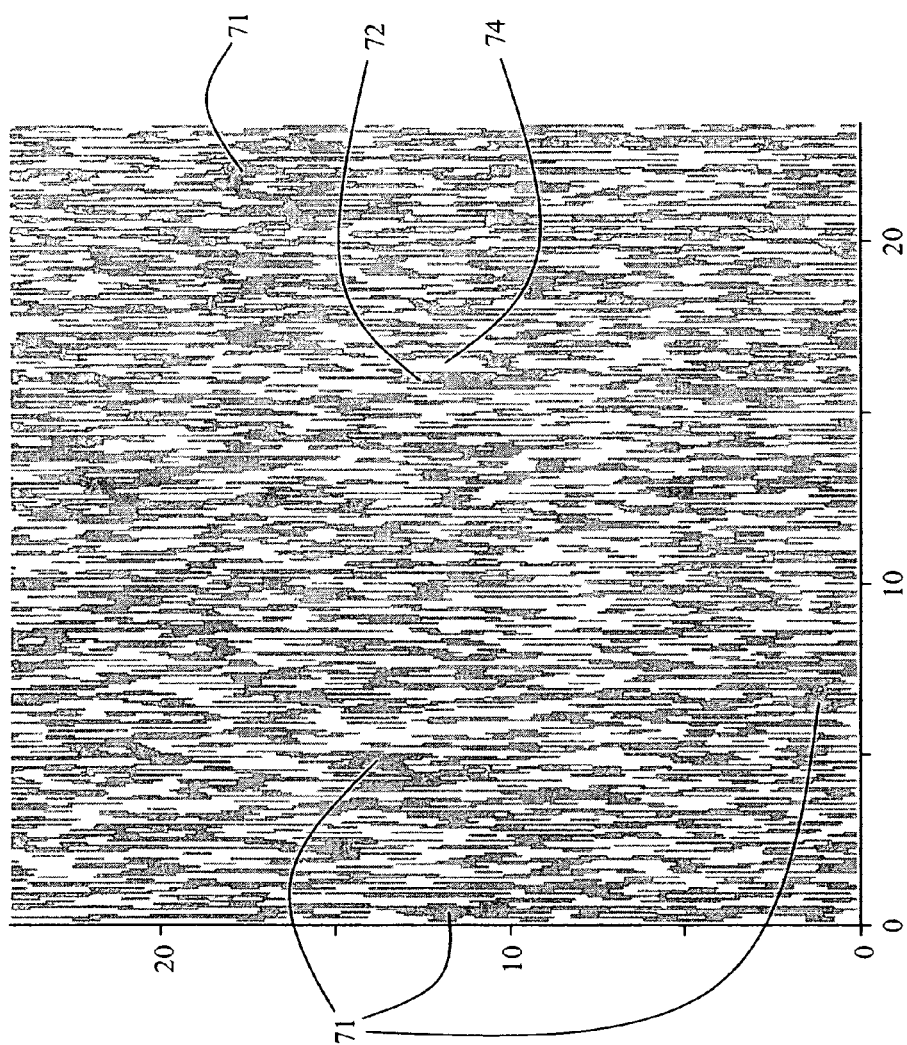
FIG. 11 is a schematic drawing of the locations of shorter elements in a light redirecting film layout.

FIG. 11 shows a schematic diagram of the locations of shorter element shapes in an example light redirecting film exhibiting a blotchy pattern. The light redirecting film comprises two element shapes with the same width, but with two lengths, approximately 1.2 mm for the shorter elements and 1.7 mm for the longer elements. The length of each element in the light redirecting film was chosen independently by the value of a uniformly chosen random boolean variable in a computer program. The lines in FIG. 11 are the locations of the ridges of the shorter elements. The scale of the diagram in mm is indicated on the axes. Several clumps 71 and 72 of shorter elements are present in the layout. A clump 72 of shorter elements is particularly visible in contrast to an adjacent clump 74 of longer elements. The exact edges and dimensions of the clumps 71, 72, and 74 are hard to define, but they have rough sizes on the order of one to several millimeters, making them visible to the human eye. A light redirecting film was created with the layout of optical elements shown in FIG. 11, and the blotchy pattern in the light redirecting film matched the positions and shapes of the clumps shown in the diagram.

Figure 12:
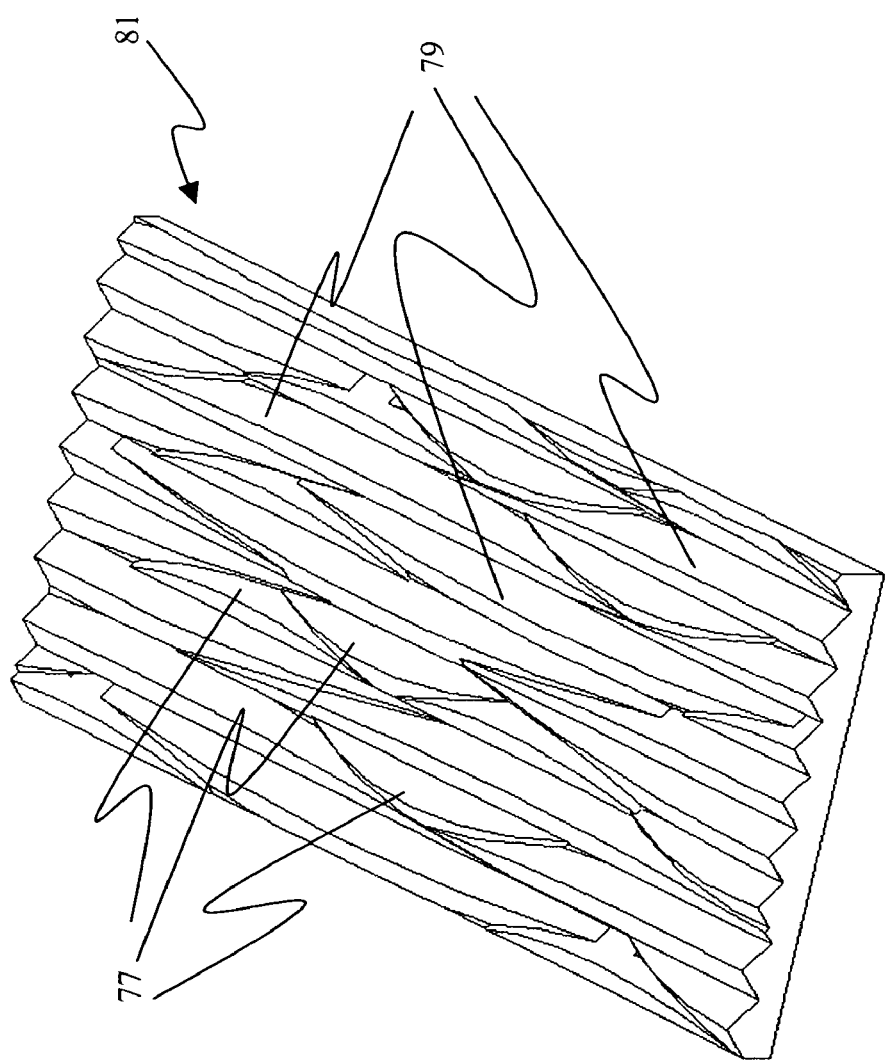
FIG. 12 shows a schematic drawing of a light redirecting film with elements of multiple lengths.

FIG. 12 shows a schematic view of a portion of a light redirecting film 81 according to an embodiment of the invention. The film comprises shorter elements (some shown as 77) and longer elements (some shown as 79), approximately 50% of each shape. The elements comprise one planar side and one cylindrical side that meet in a circular ridge. The elements are arranged in columns with elements that alternate between orientations that are rotated 180 degrees relative to each other. Each element is chosen to be either short or long as described below, and the lengthwise spacing between elements is chosen to be as large as possible without allowing uncovered area to appear between the elements. Generally this results in the endpoints of each element being at approximately the midpoints of the neighboring elements in the column. Finally the widthwise position of the elements is displaced in the manner disclosed in U.S. patent application Ser. No. 10/939,769, the disclosure of which is incorporated herein by reference.

The lengths of individual optical elements in light redirecting film 81 maintain an even yet engineered random distribution of the two elements across the film. For each element shape, a target percentage of that element shape is maintained in each small neighborhood of the film, to avoid blotchy patterns. Of the elements within a circle of radius 1 mm, the percentage of shorter elements 77 whose center points are in the circle is within 10% of the target value 50%, for all possible locations of the circle on the film. An element is considered to be in the circle if its center point is in the circle. Similarly, the percentage of longer elements 79 in the circle is between 40% and 60%, for all possible locations of the circle on the film. Generally, maintaining the percentage of elements in each neighborhood to within 10% of the target value is sufficient to avoid blotchy patterns, while allowing more than 10% variation can allow some clumps to be visible at certain viewing angles. A more random layout may be achieved by enlarging the circle considered or allowing a wider variation of percentages in each neighborhood. For example, if a circle with a 2 mm radius is used, then small element shape clumps will be visible if the film or display is viewed closely, but these small clumps will make the film look more diffuse or random when viewed from a distance.

Such a layout may be created by several algorithms. For example, when choosing the length of a new element, an algorithm might check the percentage of element shapes within a small distance of the new element location. If the percentage of short elements is above 55%, the new element is chosen to be long; if the percentage of short elements is below 45%, the new element is chosen to be short, and if the percentage of short elements is within 5% of the target value then the new element shape is chosen uniformly randomly. Another example algorithm might first generate all element shapes independently and randomly, then check all possible circle locations for clumps of long or short elements, changing the shape of elements in each clump until the desired percentage is achieved. Other possible algorithms will be appreciated by those skilled in the art with the benefit of the present disclosure. The foregoing has been described with particular target values and percentage limits, but the values and limits may be set to other values as required by each application.

Light redirecting film 81 has a number of advantages. The layout using alternating element orientations is efficient in the sense that it uses few individual optical elements to completely cover the surface of the film. No uncovered area is present. The two element shapes are visually significantly different, resulting in a diffuse, speckled appearance that masks cosmetic defects. The film is resistant to Moiré because the varying element shapes scatter light off their ridges in different ways, and the random variation in element shape further breaks up patterns in the film layout, making it less likely to interact with the other structures in a display. Objectionable patterns widthwise lines, diagonal lines, lengthwise lines, and blotchy patterns are all absent from light redirecting film 81.

Lengthwise lines are not present in light redirecting film 81 because of the variable spacing within each column that results from the two element lengths. As the lengths of elements vary more, lengthwise lines get shorter and more random looking until they are indistinguishable from the diffuse look of the light redirecting film itself. The lengths of elements must vary by at least 10% of their average length in order to change the relative position of elements in neighboring columns sufficiently to hide most lengthwise lines. Preferably the lengths of elements vary by at least 20% to avoid the appearance of lengthwise lines entirely. Furthermore, lengthwise lines are typically most visible at high widthwise off-axis viewing angles such as that graphed in FIG. 9. As illustrated in FIG. 9, the visually significant difference in feature shapes at these viewing angles helps to hide patterns in the film.

Figure 13:
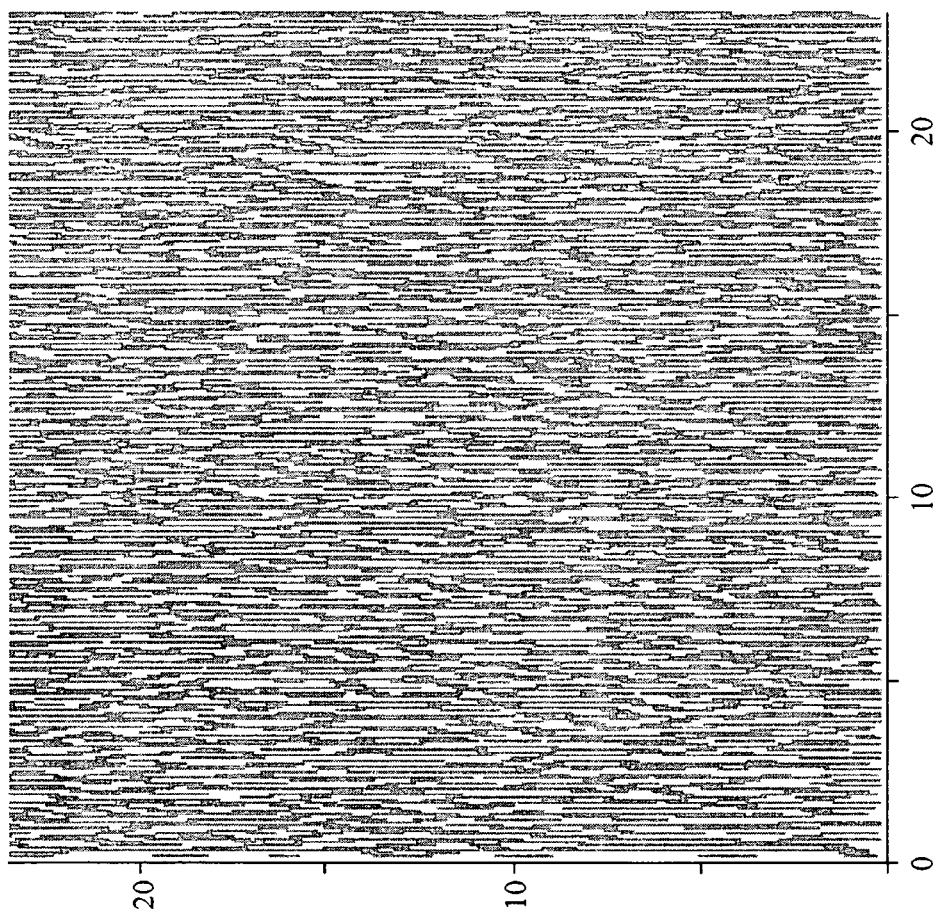
FIG. 13 is a schematic drawing of the locations of shorter elements in a light redirecting film layout.

FIG. 13 shows a schematic diagram of the locations of shorter element shapes in light redirecting film 81, in comparison to FIG. 11. Clumps of element shapes are not present or are very small in FIG. 13, and the resulting light redirecting film does not exhibit a visible blotchy pattern.

In a test of the present invention, a light redirecting film 81 as described above was made. Shorter elements 77 were approximately 1.2 mm long and up to 62 micrometers wide depending on their intersections with neighboring elements, and their cylindrical surface had a radius of curvature of approximately 4 mm. Longer elements 79 were approximately 1.7 mm long, 62 micrometers wide, and their cylindrical surface had a radius of curvature of approximately 8 mm. The average pitch of the light redirecting film was approximately 36 micrometers, resulting in high on-axis gain. Moiré was visible with fewer liquid crystal modulators than when prior art light redirecting films were used. Significantly fewer small cosmetic defects were visible on the light redirecting film than a light redirecting film made with a single element shape. Objectionable patterns widthwise lines, diagonal lines, lengthwise lines, and blotchy patterns were all absent from the film, either viewed alone on a backlight or in a desktop LCD monitor.

Figure 14:
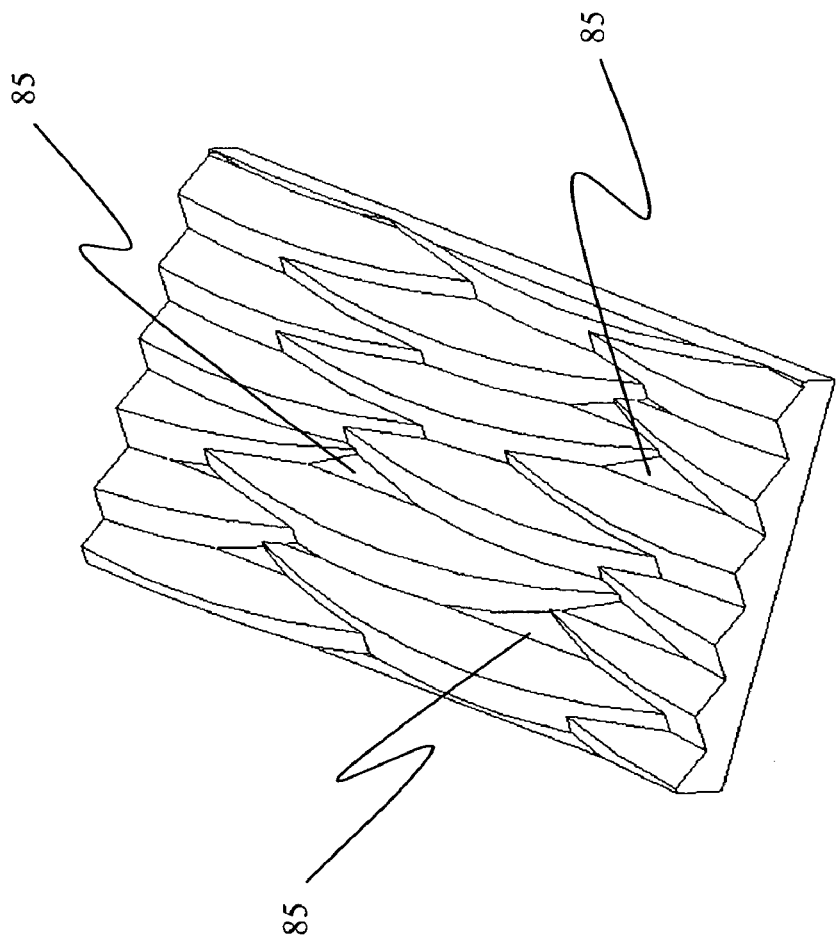
FIG. 14 shows a schematic drawing of a light redirecting film with uncovered area.

In another example embodiment of the invention, individual optical elements of varying element shapes may be used to avoid uncovered area when randomizing element positions, in addition to other advantages. A software package is used to first arrange elements into an ordered pattern that substantially or completely covers the surface of the film. A random displacement is then applied to each of the elements to move forward, back, or to one side. The displacements can be applied in a single direction only, or in two nonparallel or perpendicular directions. In some cases, for example when two elements that are next to each other each have a random displacement away from each other, an uncovered area occurs between the two elements, reducing the on-axis brightness of the film. FIG. 14 shows a schematic drawing of a light redirecting film with randomized elements with uncovered area (some examples shown as 85). The film in FIG. 14 was created by placing the elements in an initial pattern like that shown in FIG. 3A with no uncovered area, then randomly displacing each element by up to 20% of the initial feature pitch in the lengthwise and widthwise directions. The resulting film has approximately 3.9% uncovered area.

Figure 15:
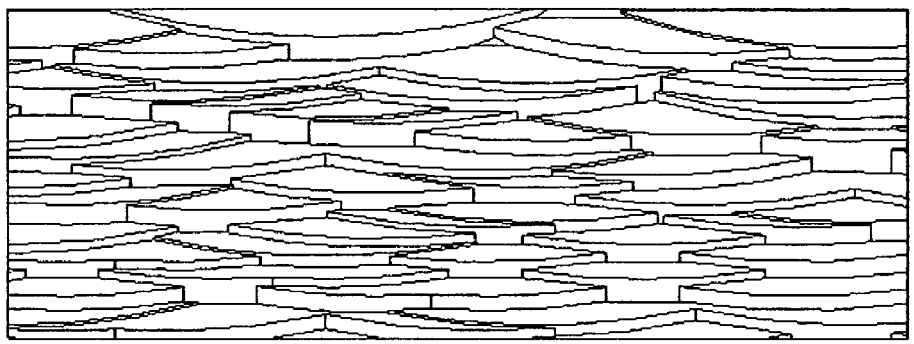
FIG. 15 shows a schematic drawing of a light redirecting film with reduced average pitch.

In order to prevent these uncovered areas, the elements may be overlapped before the random displacement is applied, such that if two elements were to move away from one another, no open area would be created. To prevent uncovered area in this way, the overlap must be at least twice the maximum distance of random displacement. An example of this case is shown in FIG. 15, where the elements have been overlapped by 40% of their pitch in both directions before randomization. When the elements are overlapped, their average pitch decreases and any land on the ridge of the element becomes a larger percentage of the total surface area, causing a decrease in on-axis gain.

A light redirecting film can be designed that maintains a high average pitch while creating little or no uncovered area during randomization by using multiple shapes of individual optical elements. In one example embodiment, the layout of the redirecting film is derived by forming a first size individual optical element in an overlapping layout where the overlap is less than 20%. Then the elements are randomly displaced in one or two directions. For example, the elements may be displaced by the distance of 10 to 20% of the first size element as measured in the direction of the displacement. Then the elements adjacent to the open areas are enlarged to create a second element of a size corresponding to the size of the first element plus the amount of displacement carried out during random displacement. If the elements are made wider, then preferably they are also made taller by half the difference in width to keep the surfaces at approximately a 45 degree angle with the substrate. For example, if the first-size elements are displaced parallel to the long dimension of the elements, then the length of the second size elements will correspond to the length of the first-size elements plus the amount of random displacement. In addition, where the random displacements move neighboring elements closer together, then the element may be shorter or thinner while still allowing no uncovered area around it.

Figure 16:
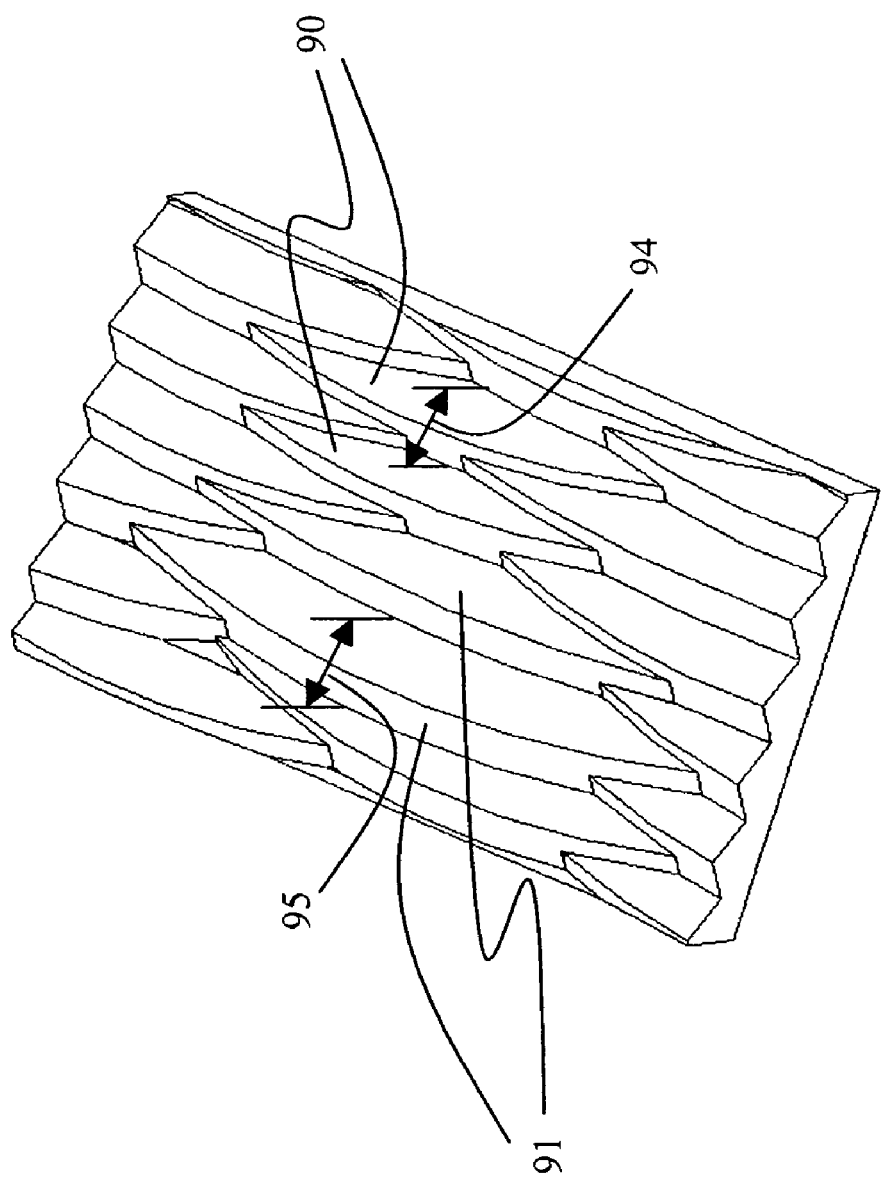
FIG. 16 shows a schematic drawing of a light redirecting film with elements of varying width.

FIG. 16 shows a schematic drawing of an example light redirecting film with first sized elements (some shown as 90) with width 94 and second sized elements (some shown as 91) whose widths 95 correspond to the width 94 of the first elements 90 plus the amount of displacement. In this example film, the elements 90 are randomly displaced by approximately 10% of the pitch of the elements in each direction, and the elements also vary in length, width, and height by approximately 10% as well. The open areas are filled with the second sized elements 91 to reduce or eliminate the uncovered area such that the resultant film has a larger average pitch than the film would have if it were made up of only the first sized elements 90 with no uncovered area.

The film shown in FIG. 16 exhibits a number of advantages. The film has a higher average pitch than a similar film without varying element shapes, so the film will have higher on-axis gain, or manufacturing tolerances could be loosened such that the land could become larger to have the same on-axis performance as the more overlapped film. The element shapes are visually significantly different, so the surface of the film has a more diffuse, textured look that helps to mask cosmetic defects. Although the film might be expected to exhibit widthwise lines because of the initial ordered layout, widthwise lines are only slightly visible because of the randomization and the varying element shapes.

When the light redirecting film has a portion of the individual optical elements extending above the surrounding elements, and when the film is brought into contact with a second surface, the redirecting film does not significantly contact the second surface except at the raised elements. This avoids optical coupling of the element ridges with the second surface, which coupling could otherwise decrease the on-axis gain of the film. The lack of contact also protects the ridges of the lower elements from damage caused by contact, abrasion, or deformation forces with the second surface. The lack of contact also reduces the possibility of Newton ring effects. Newton rings occur when two reflective surfaces (for example light redirecting films or other optical films in a liquid crystal display) are close enough to each other that the distance starts to approximate the wavelength of light. Light reflects between the two surfaces as well as passing through them, creating interference effects. The phenomenon is undesirable to a viewer through a liquid crystal display. Having a percentage of the elements extend above other elements on the light redirecting film serves to keep the light redirecting film from being too close to other films in the liquid crystal display and reduces or eliminates Newton ring effects.

Figure 17:
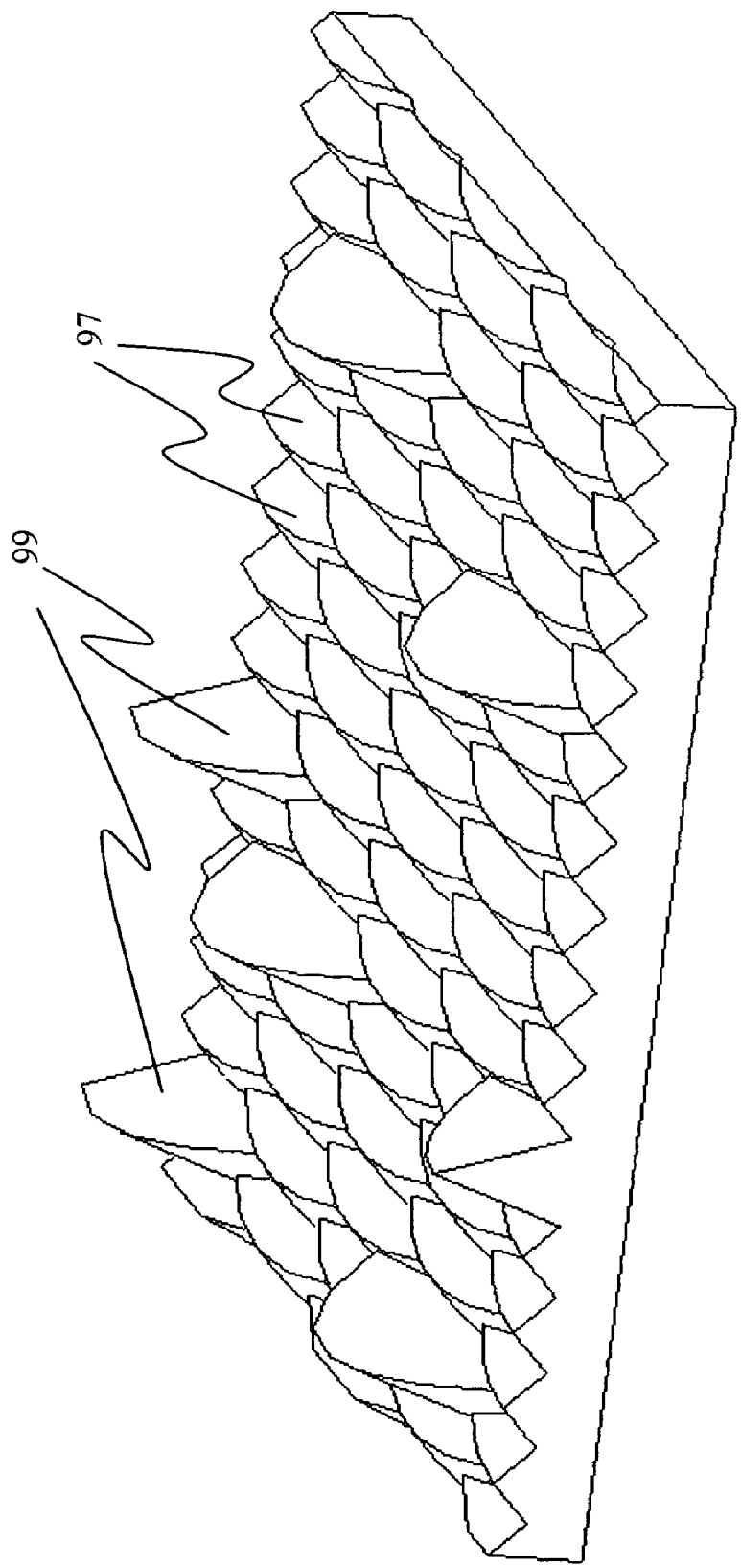
FIG. 17 shows a schematic drawing of a light redirecting film with lower elements and some raised elements that extend above the lower elements.

Preferably, the raised elements extend 3 to 20 micrometers above the surrounding lower elements. When the raised elements are 3 micrometers or less above the surrounding lower elements, there is not enough offset created by the raised elements and contact with the lower elements may occur. When the raised elements are more than 20 micrometers above the surrounding lower elements, their larger size can make them become visible to viewers of the film or the display. FIG. 17 shows a schematic drawing of a light redirecting film with lower elements (one shown as 97) and some raised elements (one shown as 99) that extend above the lower elements, exaggerated for illustrative purposes. The positions of the raised elements may be randomized to avoid creating optical patterns or Moiré.

Preferably, the average distance between two raised elements 99 is between 10 and 40 times the difference in height between the raised elements 99 and the surrounding lower elements 97. If the distance is large, over 40 times the difference in height, then Newton rings may form because parts of the film between the raised elements may be close enough to the adjacent film to cause Newton rings. There are diminishing benefits achieved when raised elements are added such that the distance between the raised elements is 9 times the difference in height between the raised and lower elements or less.

The present invention has been described in terms of several example embodiments using multiple individual element shapes. These embodiments have been described separately for reasons of clarity. It will be understood by those skilled in the art that various methods may be combined in a single embodiment. For example, methods described in this disclosure could be used to vary the width and height of the elements in film 81 for additional advantages. Similarly, methods to vary the length of the elements could be used together with the film of FIG. 16.

The light redirecting film of the present invention may be manufactured by a number of processes known in the art, typically comprising replication from a precision patterned mold or roller. Such processes include melt extrusion from a die and quenching on patterned roller, vacuum forming, injection molding, coating UV curable materials on a substrate then curing them, and embossing lenses in a polymer web.

A mold or roller to manufacture the present invention may be manufactured by a number of processes known in the art, typically comprising cutting cavities in a mold or roller. Such processes may include machining with diamond cutters, lithographic techniques, or electromechanical engraving as disclosed in U.S. patent application Ser. No. 10/859,652, incorporated herein by reference. Such methods may also include electroforming from a master mold, tiling replicas together to make a larger mold, or other mold replication methods.

Figure 18:
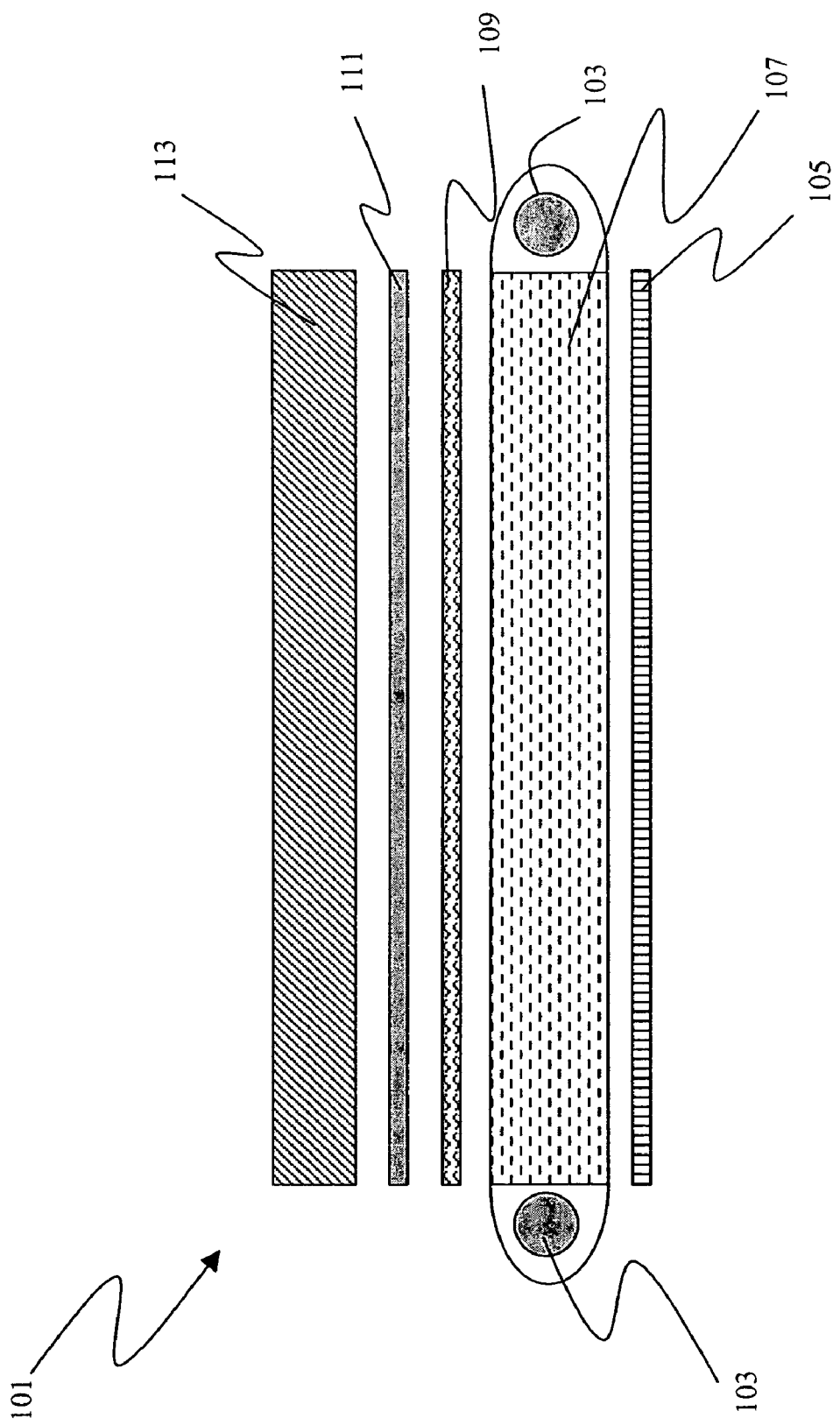
FIG. 18 is a schematic that shows a liquid crystal display incorporating the light redirecting film.

FIG. 18 shows the light redirecting film 111 incorporated into a liquid crystal display 101. The light source 103 is typically a cold cathode fluorescent lamp (CCFL) or LEDs, but can be any source capable of producing light. Light from the light source 103 enters the light guide 107. The light guide 107 may be tapered or a slab and has a back reflector 105 on one side of the light guide 107. The light exits the light guide through the side opposite to the back reflector 105 and passes through a diffuser 109. The diffuser 109 serves to even the light output of the light guide 107 across the display, hide any elements that are sometimes printed onto or embossed into the light guide, and reduce Moiré. Next the light passes through the light redirecting film 111 and the light output from the light redirecting film 111 is in a narrower cone compared to the light entering the film. The light redirecting film 111 is preferably oriented such that the individual optical elements face away from the light guide 107. In some cases a second light redirecting film may be present in the display, with its optical elements in a substantially perpendicular orientation to those in the first light redirecting film 111, to redirect the light in the perpendicular direction as well. The light then enters the liquid crystal light modulator 113 or other light gating device. Between the light redirecting film 111 and the light modulator 113 there can be other films such as a top diffuser or a reflective polarizer. Liquid-crystal displays of the type described are widely commercially available, such as the desktop monitor model number M190EN04 V.2 available from AU Optronics Corp.

Light redirecting films of the present invention are preferably free of defects, including objectionable patterns, that are visible when the film is viewed in a display such as described above. Standard desktop monitor viewing conditions are those in which a display is viewed from a distance of 450-600 mm, and from all possible viewing angles in front of, to the side of, and above and below the display, and with ambient lighting conditions such as those found in a typical office environment. A defect is considered visible if it is visible at any viewing angle by a person with normal visual acuity as described herein. Defect visibility will be somewhat affected by the particular display and configuration that the film is assembled into, but defect visibility generally correlates between different displays. In some cases, other films or a liquid-crystal light modulator on top of the light redirecting film will hide defects that are visible in the film alone. Defect visibility in any display assemblies will limit the potential market for the film and reduce value.

More preferably, objectionable patterns and other defects will not be visible in the film when placed on a lit backlight and viewed without other films or a liquid-crystal modulator on top of it. When defects are not visible in the film alone, then the display or backlight manufacturer may proceed with the highest confidence that defects will not be visible in the fully assembled display. In standard LCD backlight viewing conditions, the light source 103, back reflector 105, light guide 107, diffuser 109, and light redirecting film 111 are assembled and the light source 103 is provided with power to produce light. The backlight is viewed from all viewing angles, in a darkened room to remove sources of ambient light that can make defects less visible. A defect is considered visible if it is visible at any viewing angle by a person with normal visual acuity as described herein. These viewing conditions are well known and practiced in the industry.

The invention has been described in detail with particular reference to certain preferred embodiments thereof, but it will be understood that variations and modifications can be effected within the spirit and scope of the invention.

PARTS LIST

1. Individual optical element
2. Substrate
3. Curved surface
5. Planar surface
7. Ridge
8, 9. Ridge end
11. Individual optical element
13, 15. Curved surface
16. Ridge
17. Lengthwise direction
18. Widthwise direction
21. Land
23, 24, 25, 26. Pitch
27. Width
31, 33. Element
35, 36. Width
37, 38. Length
40. Curve
42, 44, 46. Luminance curve
48, 49. Point
52, 54. Luminance curve
56. Point
61. Diagonal line
62, 63, 64, 65. Element
71, 72, 74. Clump
77. Shorter element
79. Longer element
81. Light redirecting film
85. Uncovered area
90. First sized elements
91. Second sized elements
94, 95. Width
97. Lower element
99. Raised element
101. Display
103. Light source
105. Back reflector
107. Light guide
109. Diffuser
111. Light redirecting film
113. Liquid crystal modulator

The invention claimed is:

1. A light redirecting film comprising a thin optically transparent substrate having opposite sides, one side of the substrate substantially covered by elongated individual optical elements whose longest dimensions are substantially aligned in a lengthwise direction, wherein the shape of at least some of the optical elements have a visually significant difference, and wherein the layout of optical element shapes and locations is such that objectionable patterns are not visible in the film under standard LCD backlight viewing conditions, and wherein the longest optical elements have an aspect ratio at least 5% larger than the shortest optical elements and the percentage of surfaces of substantially the same aspect ratio in a circle of 2 mm radius does not vary by more than 10% from a target value over all possible circle positions on the film.

2. The film of claim 1 comprising individual optical elements wherein two sloping surfaces intersect each other to form a ridge having two ends where it intersects the substrate or other optical elements.

3. The film of claim 2 wherein at least one of the sloping surfaces is curved.

4. The film of claim 3 wherein the radius of curvature of the curved surfaces of the individual optical elements varies by at least 10%.

5. The film of claim 1 wherein the longest optical elements have an aspect ratio between 15% and 100% larger than the shortest optical elements.

6. A light redirecting film comprising a thin optically transparent substrate having opposite sides, one side of the substrate substantially covered by elongated individual optical elements whose longest dimensions are substantially aligned in a lengthwise direction, wherein the shape of at least some of the optical elements have a visually significant difference, and wherein the layout of optical element shapes and locations is such that objectionable patterns are not visible in the film under standard LCD backlight viewing conditions, and wherein the longest optical elements have an aspect ratio at least 5% larger than the shortest optical elements and the percentage of surfaces of substantially the same aspect ratio in a circle of 1 mm radius does not vary by more than 10% from a target value over all possible circle positions on the film.

7. The film of claim 1 wherein the layout of optical elements in the film is engineered random.

* * * * *